(12) United States Patent
Omaru (10) Patent No.: US 7,217,476 B2
(45) Date of Patent: May 15, 2007

(54) BATTERY

(75) Inventor: Atsuo Omaru, Fukushima (JP)

(73) Assignee: Sony Corporation, Tokyo (JP)

( * ) Notice: Subject to any disclaimer, the term of this patent is extended or adjusted under 35 U.S.C. 154(b) by 302 days.

(21) Appl. No.: 10/661,990

(22) Filed: Sep. 11, 2003

(65) Prior Publication Data
US 2004/0058247 A1    Mar. 25, 2004

(30) Foreign Application Priority Data
Sep. 11, 2002    (JP)    ............................ P2002-265951

(51) Int. Cl.
*H01M 2/16*    (2006.01)
*H01M 4/00*    (2006.01)
*H01M 4/58*    (2006.01)
*H01M 4/50*    (2006.01)

(52) U.S. Cl. .................. 429/246; 429/221; 429/213.1; 429/231.2; 429/231.3; 429/231.5; 429/223; 429/224

(58) Field of Classification Search .............. 429/235, 429/245, 246, 231.1, 231.3, 221, 231.2, 231.5, 429/224, 223
See application file for complete search history.

(56) References Cited
U.S. PATENT DOCUMENTS 6,682,853 B2 *   1/2004   Kimijima et al. ........... 429/246
6,933,077 B2 *   8/2005   Sudano et al. .............. 429/208

FOREIGN PATENT DOCUMENTS

JP          9-120818      *   5/1997

OTHER PUBLICATIONS

MatWeb Material Property Data "Overview—Polycarbonate, Molded" http://www.matweb.com/search/SpecificMaterial.asp?bassnum=O3100; copyright 1996-2000 by Automation Creations, Inc.*
MatWeb Material Property Data "Overview—polypropylene, Molded" http://www.matweb.com/search/SpecificMaterial.asp?bassnum=O4700; copyright 1996-2000 by Automation Creations, Inc.*

* cited by examiner

*Primary Examiner*—Patrick Joseph Ryan
*Assistant Examiner*—Thomas H. Parsons
(74) *Attorney, Agent, or Firm*—Sonnenschein Nath & Rosenthal LLP (57) ABSTRACT

Disclosed is a battery with a light weight and a high energy density. The battery includes a anode 5, having a layer of an anode active material 9 formed on an anode substrate 8, a cathode 6, including a layer of a cathode active material 14 formed on a cathode substrate 13, and a non-aqueous liquid electrolyte 4. The anode substrate 8 includes an anode resin film 11 containing a polymer and an anode metal layer 12 containing an electrically conductive metal. Since the anode resin film 11 reduces the weight of the anode substrate 8 and the anode metal layer 12 imparts electron conductivity to the anode substrate 8, the battery may be reduced in weight without detracting from battery characteristics to increase the energy density.

8 Claims, 1 Drawing Sheet

FIG. 1

BATTERY

BACKGROUND OF THE INVENTION

1. Field of the Invention

This invention relates to a battery having an anode, a cathode and an electrolyte and which is appreciably improved in energy density.

This application claims the priority of the Japanese Patent Application No. 2002-265951 filed on Sep. 11, 2002, the entirety of which is incorporated by reference herein.

2. Description of Related Art

Recently, development in a lightweight secondary battery with a high energy density, as a power supply for electronic equipment such as a notebook personal computer, a portable telephone set and a VTR (video tape recorder) with a built-in camera, is progressing. Among the secondary batteries having the high energy density, there is a lithium secondary battery having an energy density larger than that of the aqueous electrolyte battery, exemplified by a lead battery, a nickel-cadmium battery or a nickel-hydrogen battery.

With the lithium secondary batteries, such inconveniences may arise that lithium tends to be precipitated on the anode during charging, while lithium precipitated by repetition of charging/discharging tends to grow in size in the form of dendrites, with the precipitated lithium being inactivated to lower the battery capacity.

Such a lithium ion secondary battery in which a carbonaceous material is used as an anode, is known as a secondary battery designed to overcome the problem. Specifically, the lithium ion secondary battery uses an anode obtained on compacting the carbonaceous material in a finely divided state along with a binder.

This lithium ion secondary battery exploits, as a battery reaction, such a reaction consisting in intercalating lithium between layers of a carbonaceous material used for an anode, such as graphite. For this reason, with the lithium ion secondary battery, a carbonaceous material, capable of doping/undoping lithium, is used as the anode active material. This prohibits lithium from becoming precipitated to the anode of the lithium ion secondary battery at the time of charging to achieve superior battery characteristics. With this lithium ion secondary battery, the carbonaceous material used for the anode is also stable in air, thus improving the yield in manufacturing the batteries.

With the above lithium ion secondary battery, in which the energy density can be larger than in the aqueous liquid electrolyte battery, it is requested to increase the energy density further in keeping up with the increasing power consumption in the electronic equipment of these days. In particular, with the lithium ion secondary battery, used in portable electronic equipment, it is requested to reduce the weight of the battery further and to increase its energy density, such that the weight reduction is a task of utmost importance.

SUMMARY OF THE INVENTION

It is therefore an object of the present invention to provide a battery which is lightweight and which may achieve high energy density.

For accomplishing the above object, the present invention provides a battery comprising an anode, including an anode substrate and a layer of an anode active material, formed on the anode substrate, a cathode, including a cathode substrate and a layer of a cathode active material, formed on the cathode substrate, and an electrolyte, containing an electrolyte salt, wherein the anode substrate and/or the cathode substrate include a resin layer containing a polymer and a metal layer containing electrically conductive metal.

With the present battery, the resin layer, having a true specific gravity lower as compared to e.g. metal, helps reduce the weight of the anode substrate or the cathode substrate to a large extent, with the metal layer containing electrically conductive metal donating electron conductivity to the anode substrate and/or to the cathode substrate.

Thus, with the present battery, the battery in its entirety is reduced in weight by marked weight reduction of the anode substrate and/or the cathode substrate, thereby increasing the battery capacity per unit weight, that is energy density.

With the battery of the present invention, in which the true specific gravity of the resin layer containing a polymer may be lower as compared to the conventional metal foil, the battery can be lightweight to increase the battery capacity per unit weight, that is, the energy density.

Thus, the present battery can be used broadly as a lightweight large-capacity power supply for example for portable electronic equipment.

DESCRIPTION OF THE PREFERRED EMBODIMENTS

Figure 1:
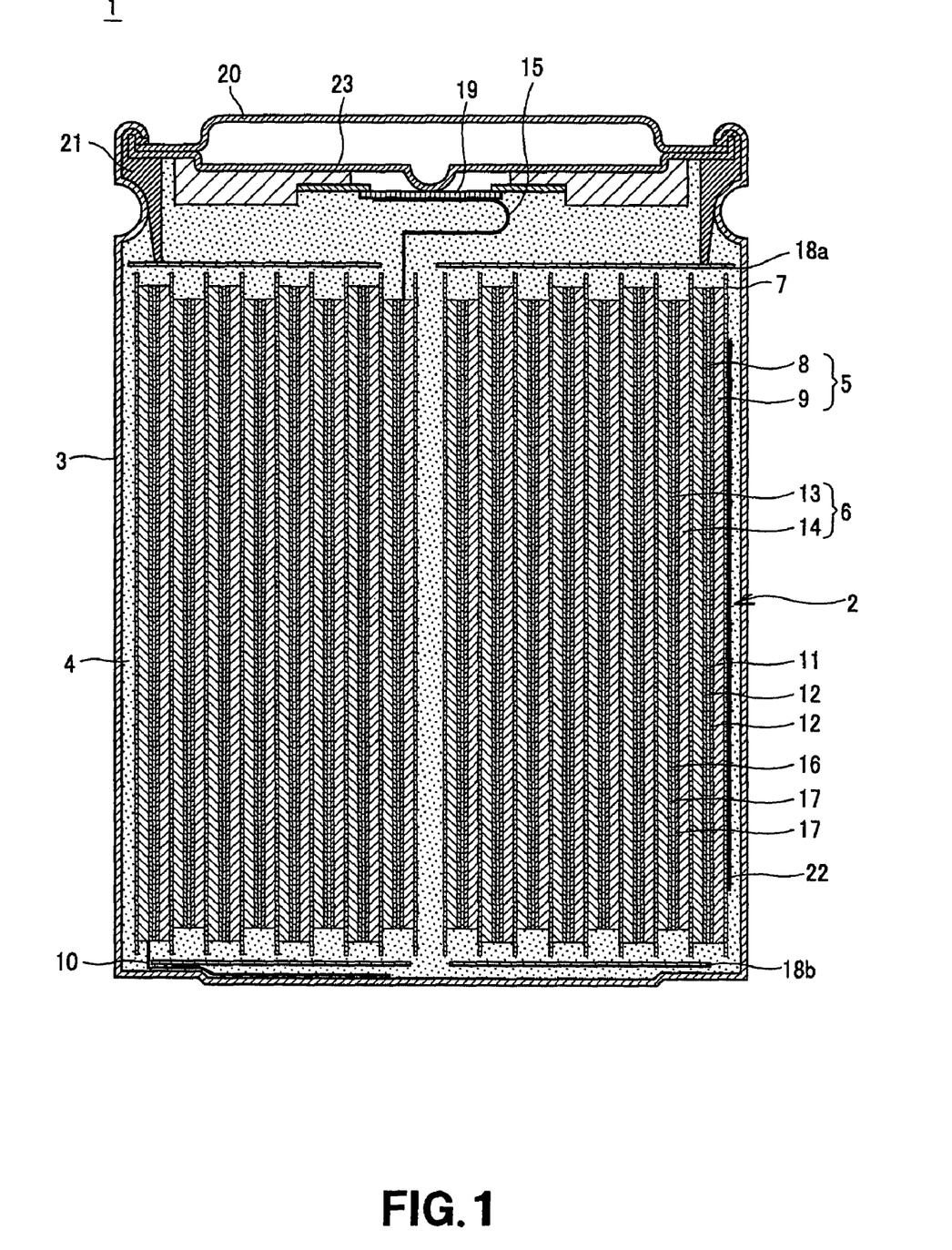
FIG. 1 is a cross-sectional view showing an inner structure of a lithium ion secondary battery embodying the present invention.

Referring to FIG. 1, showing a cylindrically-shaped lithium ion secondary battery 1, sometimes referred to below as a battery 1, the battery according to the present invention will be explained in detail. This battery 1 is a non-aqueous electrolyte battery and is of such a structure in which a battery element 2 as a power generating element is sealed in an outer can 3 along with a non-aqueous liquid electrolyte 4.

The battery element 2 is of such a structure in which a band-shaped anode 5 and a band-shaped cathode 6 are coiled together with a band-shaped separator 7 in-between.

The anode 5 is made up by a band-shaped anode substrate 8 and a layer of an anode active material 9, containing an anode active material, and which is formed on the band-shaped anode substrate 8. An anode terminal 10 is connected to the anode 5, at a preset position of the anode substrate 8, so as to be protruded from one width-wise end of the anode substrate 8. As the anode terminal 10, a strip-shaped metal piece of an electrically conductive metal, such as copper or nickel, is used.

In the anode 5, the anode substrate 8 is made up by an anode resin film 11, composed e.g. of a polymer film, and an anode metal layer 12, formed e.g. of an electrically conductive metal.

In the anode 5, the material of the polymer film, forming the anode resin film 11, may be exemplified by an olefinic resin, a sulfur-containing resin, a nitrogen-containing resin, and a fluorine-containing resin. One of these resins or a compound of a plural number of these resins is used. Specifically, a film of a polymer exemplified by polyethylene, polypropylene, polyvinylidene fluoride, polytetrafluoroethylene, nylon, polyphenylene sulfide, polyester, cellulose triacetate, Mylar, polycarbonate, polyimide, polyamide, and polyamideimide, may be used.

In the polymer film, used in the anode resin film 11, the content of the element(s) having an atomic number larger than that of carbon is suppressed, in order to decrease the true specific gravity as compared to that of the conventional anode substrate formed of the metal foil, etc., to improve the battery capacity per unit weight of the battery, or the so-called energy density. Specifically, the true specific gravity of the polymer film is desirably not less than 0.9 g/cc and not larger than 1.8 g/cc and more desirably not less than 0.93 g/cc and not larger than 1.4 g/cc. If the true specific gravity of the polymer film is outside the above-defined range, it becomes difficult to realize the desirable performance with respect to, for example, the tensile strength, tensile elasticity or thermal conductivity.

Moreover, the polymer film used in the anode resin film 11 is required to exhibit a preset value of the tensile strength, in order not to disrupt the anode substrate 8 in manufacturing the battery 1. Specifically, the tensile strength of the polymer film (ASTM: D638) is preferably not less than 0.9 kgf/mm$^2$, more preferably 2 kgf/m$^2$ and most preferably 3 kgf/mm$^2$.

Additionally, the polymer film used in the anode resin film 11 is required to exhibit a preset value of the tensile elasticity in order to suppress the adverse effects ascribable to expansion and contraction of e.g. the layer of the anode active material 9 attendant on charging/discharging. Specifically, the tensile elasticity of the polymer film (ASTM: D790) is preferably not less than 20 kgf/mm$^2$, more preferably 70 kgf/mm$^2$ and most preferably 100 kgf/mm$^2$.

Among the polymers exhibiting the tensile strength and the tensile elasticity as defined above, there are, for example, high density polyethylene, ultra-high molecular weight polyethylene, polypropylene, nylon, polyphenylene sulfide, polyester, cellulose triacetate, Mylar, polycarbonate and polyimide. The anode substrate 8, employing the anode resin film 11 formed of such polymer, is not liable to be disrupted in manufacturing the battery 1, and serves for improving the manufacturing yield.

On the other hand, the polymer film, used for the anode resin film 11, is desirably of high thermal conductivity in order to properly release heat evolved on charging/discharging the battery 1 to outside. Specifically, the thermal conductivity (ASTM: C177) of the polymer film is desirably not less than $3 \times 10^{-4}$ cal/cm$^2$·sec·(K·cm$^{-1}$)$^{-1}$. Examples of the polymers having this thermal conductivity include low density polyethylene, high density polyethylene, ultra-high molecular weight polyethylene, polypropylene, nylon, polyphenylene sulfide, polyester, cellulose triacetate, Mylar and polycarbonate.

For the anode metal layer 12 in the anode substrate 8, relatively lightweight metals, exhibiting satisfactory electron conductivity, may be used. Specified examples of these metals include copper, nickel, titanium, stainless steel, iron and aluminum, one or more of which may be used. Meanwhile, aluminum used in the anode metal layer 12 in the anode 5 is most promising in exhibiting the effect of electron conductivity. It is however necessary to cover aluminum with e.g. a metal, such as copper, not alloyed with lithium, in order to prevent aluminum from being exposed and thereby alloyed with lithium.

This anode metal layer 12 is formed to a thickness on the order of several μms on the major surface of the anode resin film 11, by a thin film forming technique, such as vapor deposition, sputtering, electroplating or electroless plating. By so doing, the anode metal layer 12 operates for increasing the electrical conductivity of the anode substrate 8 to cause the current to flow properly in the layer of the anode active material 9.

The anode metal layer 12 is formed so that, when it is formed on each major surface of the anode resin film 11, the metal film on one major surface and the metal film on the opposite major surface will be electrically connected to each other. By so doing, if the anode active material 9 is formed on both major surfaces of the anode substrate 8, the current may be caused to flow adequately in the layer of an anode active material 9 formed on each major surface of the anode substrate 8 to increase the electrical conductivity of the anode 5. The anode metal layer 12 is formed to the edge of the anode resin film 11, that is, such as to cover the entire surface of the anode resin film 11, in order to feather improve the electrical conductivity of the anode 5.

In the above-described anode substrate 8, the anode resin film 11 is formed by e.g. a polymer film, such that the true specific gravity may be reduced significantly, as compared to the conventional electrode substrate formed only by a metal foil, with the result that the battery 1 may be reduced in weight and increased in energy density.

With the anode substrate 8, the tensile strength of the polymer film, used in the anode resin film 11, may be increased significantly as compared to the case of using only a metal foil for the electrode substrate, thus assuring an increased manufacture yield of the battery 1.

With the anode substrate 8, one or more through-hole may be provided for extending from one to the other major surface of the anode resin film 11, thereby increasing the electrical contact across the anode metal layers 12 formed on both major surfaces of the anode resin film 11 for improving the electron conductivity.

With the anode substrate 8, in which its thickness is not larger than 20 μm, it is desirable for the thickness of the anode substrate 8 to be on the order of 10 μm. If the thickness of the anode substrate 8 is too thin, the anode substrate 8 is lowered in e.g. its tensile strength and the manufacture yield of the battery 1 is lowered With the thickness of the anode substrate 8 larger than 20 μm, the space taken up by the anode substrate 8 in the battery is increased and the battery capacity is lowered. Thus, with the anode substrate 8, its thickness is set to not larger than 20 μm to prevent the manufacture yield of the battery 1 from being lowered or to prevent the battery capacity from being lowered.

In the anode 5, the layer of an anode active material 9 is formed in a compressed state on the major surface of the anode substrate 8 by applying a coating liquid of an anode mixture containing an anode active material and a binder to the major surface of the anode substrate 8 and drying the resulting product as the pressure is continuously applied.

As the anode active material, contained in the layer of an anode active material 9, a carbonaceous material capable of doping/undoping lithium, a lithium alloy or a lithium ion is used. Specifically, the material capable of doping/undoping lithium may be exemplified by graphitizable carbon, graphite and non-graphitizable carbon.

The non-graphitizable carbon, among the carbonaceous materials, may be exemplified by a monopolymer or a copolymer of furfuryl alcohol or furfural, or a furane resin, copolymerized with other resins and which is then sintered and carbonized. The non-graphitizable carbon is also of such physical parameters that the (002) spacing is not less than 0.37 nm, the true density is less than 1.70 g/cm$^3$ and no peak of heat evolution is exhibited at 700° C. or higher in the differential thermal analysis (DTA) in air. The non-graphitizable carbon, having the above physical parameters, represents an anode active material having a large capacity.

For producing this non-graphitizable carbon, conjugated resins such as phenol resin, acrylic resin, halogenated vinyl resin, polyimide resin, polyamideimide resin, polyamide resin, polyacetylene or poly(p-phenylene), cellulose, cellulose derivatives or optional organic high molecular weight compounds may be used.

In addition, the petroleum pitch, having a specified H/C atomic ratio and into which an oxygen-containing functional group is introduced for oxygen cross-linking, proves an ultimate non-graphitizable carbon in the solid phase state, without becoming melted in the course of graphization carried out at a temperature exceeding 400° C.

It should be noted that the petroleum pitch is produced by such operations as distillation, e.g. vacuum distillation, atmospheric distillation or steam distillation, thermal polycondensation, extraction or chemical polycondensation, from asphalt or tars obtained on high-temperature thermal cracking of coal tar, ethylene bottom oils or crude oil. At this time, the H/C atom ratio of the petroleum pitch is crucial. For producing the non-graphitizable carbon, this H/C atom ratio needs to be 0.6 to 0.8.

Among the techniques for introducing oxygen-containing functional groups, into the petroleum pitch, there are, for example, a wet method by an aqueous solution of nitric acid, a mixed acid or hypochrorous acid, a dry method by an acidifying gas, such as oxygen, and a reaction by a solid reagent, such as sulfur, ammonia nitrate, ammonia persulfate or ferric chloride. Although there is no limitation to the oxygen content of the petroleum pitch, it is preferably not less than 3% and more preferably not less than 5%, as disclosed in the Japanese Laid-Open Patent Publication H3-252053. By controlling the oxygen content in this manner, the (002) spacing of the ultimately produced carbonaceous material is not less than 0.37 nm, while no peak of heat evolution is exhibited in the DTA in air at 700° C. or higher, thus increasing the capacity.

The compound mainly composed of phosphorus, oxygen and carbon, as disclosed in the Japanese Patent Application 2001-197596, also exhibits physical parameters similar to those of the non-graphitizable carbon., and may be used as an anode active material.

Moreover, any other organic materials that prove non-graphitizable carbon through the process of solid-phase carbonization by e.g. oxygen cross-linking processing may be used as a starting material. It is noted that there is no limitation to a processing method for achieving oxygen cross-linking.

For producing the non-graphitizable carbon, the aforementioned organic material is carbonized at 300 to 700° C. and sintered, at a temperature raising rate of 1 to 100° C. per minute, at an ultimate reached temperature of 900 to 1300° C. and for the holding time at the ultimate reached temperature of 0 to 30 hours. The carbonizing operation may also be omitted, if so desired.

The non-graphitizable carbon, obtained as described above, proves an anode active material through the processes of comminution and classification. This comminution may be carried out at any time of during carbonization, calcination, in a pre- or post-stage of high temperature heat processing, or during the temperature raising process.

Among the carbonaceous materials, the graphite may be exemplified by natural graphite and artificial graphite which is processed at an elevated temperature following carbonization of an organic material.

The artificial graphite is produced from an organic material, such as coal or pitch, as a starting material. The pitch may be coal tar, ethylene bottom oil or tars obtained on high temperature thermal cracking of crude oil, products obtained from asphalt by distillation, such as vacuum distillation, atmospheric distillation or steam distillation, thermal polycondensation, extraction or chemical polycondensation, or the pitch generated on dry distillation of wood. The starting materials for pitch may be enumerated by polyvinyl chloride resin, polyvinyl acetate, polyvinyl butyrate, and 3,5-dimethylphenol resins.

Other examples of the starting materials for the pitch include condensed polycyclic hydrocarbon compounds, such as naphthalene, phenanthrene, anthracene, triphenylene, pyrene, perylene, pentaphene, or penracene, and other derivatives, such as carboxylic acids thereof, carboxylic acid anhydrides or carboxylic acid imides, or mixtures thereof, and condensed heterocyclic compounds, such as acenaphthylene, indole, isoindole, quinoline, isoquinoline, qumoxaline, phthaladine, carbazole, acrydine, phenadine or phenanthridne.

For producing artificial graphite, the aforementioned organic material is first carbonized at 300 to 700° C. and calcined, in an inert gas stream, at a temperature raising rate of 1 to 100° C. per minute, at an ultimate reached temperature of 900 to 1500° C. and for the holding time at the ultimate reached temperature of 0 to 30 hours. The product obtained up to this process is the graphitizable carbonaceous material. This material is then heat-treated at a temperature not lower than 2000° C. and preferably not lower than 2500° C. The carbonizing and/or calcining step may be omitted, if so desired.

The artificial graphite, thus obtained, is pulverized and classified to prove an anode active material. This pulverization may be by carbonization, calcination or by the temperature raising process. Ultimately, the heat treatment for graphization is carried out in a finely divided state of the artificial graphite.

The true density of graphite is preferably not less than 2.1 g/cm$^3$ and more preferably not less than 2.18 g/cm$^3$. For realizing this true density, it is necessary that the (002) spacing, as obtained by the X-ray diffraction method, is preferably less than 0.34 nm, and more preferably not less than 0.335 nm and not larger than 0.337 nm, and that the C-axis crystallite thickness on the (002) plane is not less than 14 nm.

For decreasing the deterioration in capacity with the increasing number of the battery cycles, and for elongating the useful cyclic life of the battery, the bulk density and the average value of the shape parameter x of the graphite material are crucial.

That is, the bulk density of the graphite as measured by the method described in JISK-1469 is preferably not less than 0.4 g/cm$^3$, more preferably not less than 0.5 g/cm$^3$ and most preferably not less than 0.6 g/cm$^3$. With the anode 5, containing the graphite having the bulk density not less than 0.4 g/cm$^3$, the anode material is not liable to be peeled off from the layer of the anode active material, thus assuring an optimum electrode structure. Consequently, the battery 1 having this anode 5 has an extended useful life.

For further extending the useful life, it is desirable to use the graphite which not only has the bulk density in the above range but also an average value of the shape parameter x of the general formula x=(W/T)·(L/T) of 125 or less.

The shape parameter x means a product of L/T and W/T, where T is a thickness of a thinnest portion of particulate graphite in the form of a flat column or a parallelepiped, L is the length along the long axis of the particulate graphite and W is the length thereof in a direction perpendicular to the long axis. It may be said that the smaller the shape parameter x of a graphite particle, the larger is the height with respect to the bottom surface area and the lower is the flatness of the graphite particle.

The anode 5 prepared using a graphite material having the bulk density in the above range and the average value of the shape parameter x not larger than 125 has an optimum electrode structure and a longer useful life. Meanwhile, the average value of the shape parameter x is more preferably not less than 2 and not larger than 115 and most preferably not less than 2 and not larger than 100.

On the other hand, in the grain size distribution of graphite, as found by the laser diffraction method, it is desirable that the cumulated 10% particle size, cumulated 50% particle size and the cumulated 90% particle size of graphite are not less than 3 μm, not less than 10 μm and not larger than 70 μm, respectively In particular, if the 90% particle size of graphite is not larger than 60 μm, the initial defects may be suppressed appreciably.

By affording a certain allowance to the grain size distribution, it becomes possible to charge the graphite efficiently to the electrode. It is desirable that the grain size distribution of the graphite is closer to the Gaussian distribution. If the number of distribution of the particles with a smaller grain size is larger, the risk is higher that the heating temperature at the time of the emergency such as overcharging is higher. If conversely the number of distribution of the particles with a larger grain size is large, the risk is high that malfunctions such as voltage decrease is produced at the time of initial charging. The reason is that, when the graphite lithium ions are introduced into graphite layers forming the anode 5 as charging proceeds, the crystallites of the graphite are swollen by about 10%, so that the anode 5 is more likely to press the cathode 6 or the separator 7.

Thus, by employing graphite having a grain size distribution comprising a wide range of particle sizes from the coarse grains to fine grains, in a well-balanced fashion, such battery 1 having a higher operating efficiency may be produced.

The average value of the destruction strength of graphite particles is desirably not less than 6 kgf/mm$^2$. In general, with the graphite having high crystallinity, hexagonal lattice faces are developed along the a-axis direction, and c-axis crystallites are formed by the hexagonal lattice faces heaped together. However, the hexagonal lattices of carbon are bound together by the weak bonding proper to the Van der Waals force and hence are liable to be deformed by the force of stress. Thus, when graphite is compression-molded and packed into a battery, it is more susceptible to collapsing than the carbonaceous materials sintered at a lower temperature, such that it is difficult to procure voids. The non-aqueous liquid electrolyte 4 is held in the voids in the carbonaceous material, so that, the larger the number of the voids, the larger is the amount of the non-aqueous liquid electrolyte 4 and the better is the ion diffusion at the time of discharging.

In other words, with the average value of the destruction strength of graphite particles of not less than 6 kgf/mm$^2$, a sufficient number of voids may be procured in the graphite and a sufficient amount of the non-aqueous liquid electrolyte 4 may be accommodated. That is, with the battery 1 employing this type of graphite, ion diffusion at the anode 5 is optimized to improve load characteristics.

The anode active material is preferably a graphized molded product which is obtained by heat treating a molded product of the carbonaceous material and by pulverizing and classifying the so produced graphized molded product. This graphized molded product is higher in bulk density and in destruction strength than the above-mentioned graphite.

The graphized molded product is obtained by mixing coke as a filler and a binder pitch as a molding or sintering agent, carbonizing the resulting mixture by pitch immersion and graphizing the resulting product. It is possible to use a starting material of the filler, to which are imparted molding and sintering characteristics, in order to obtain a similar graphized molded product.

The graphized molded product is made up by the coke as the filler and the binder pitch, polycrystal pairs are produced following the graphization, while sulphur or nitrogen is contained in the feedstock and turned into a corresponding gas at the time of the heat treatment, thus producing micro-sized pores for the gas to pass to facilitate doping/undoping of lithium ions as the anode material. From the perspective of application to the industry, there is further an added merit that it is possible to raise the processing efficiency.

Among the carbonaceous materials, the graphitizable carbon is prepared from a starting material which is similar to that for the artificial graphite described above. In the course of carbonization, the coal or the pitch exists as a liquid at a maximum temperature of the order of 400° C. By maintaining this temperature, the aromatic rings are condensed together to form a polycyclic state to set up a laminated oriented condition. When the temperature is raised to 500° C. or higher, a solid carbon precursor, that is semi-coke, is formed. This process is typical of the process of forming graphitizable carbon, and is termed a liquid-phase carbonizing process.

In the anode 5, metals capable of doping/undoping lithium or intermetallic compounds, as an anode active material, may be contained, in addition to the aforementioned carbonaceous materials, in the layer of anode active material 9.

The anode active material other than the carbonaceous materials include metal compounds represented by the chemical formula $M_xM'_yLi_z$, where M is a metal element that can be alloyed with lithium, M' is a metal element other than the element Li and the element M, x is a numerical value larger than 0 and y, z are numerical values not less than 0. In these metal compounds, represented by the above chemical formula, B, Si or As, as semiconductor elements, may also be used as metal elements that can be alloyed with lithium. Specifically, metal elements, such as Mg, B, Al, Ga, In, Si, Ge, Sn, Pb, Sb, Bi, Cd, Ag, Zn, Hf, Zr, Y or As, metal compounds containing these metal elements, Li—Al, Li—Al-M, where M is one or more of transition metal elements of the 2A, 3B and 4B groups, AlSb or CuMgSb, for example, are used as an anode active material.

In particular, as the metal elements that can be alloyed with lithium, typical elements of the 3B group are desirable. Of these elements, Si or Sn, especially Si, is desirable. Specifically, Si and Sn compounds represented by the chemical formulas of $M_xSi$ and $M_xSn$, where M is one or more element other than Si or Sn and x is a numerical value not less than 0, for example, $SiB_4$, $SiB_6$, $Mg_2Si$, $Mg_2Sn$, $Ni_2Si$, $TiSi_2$, $MoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$ or $ZnSi_2$, may be used either singly or in combination.

In the anode active material 9 may be contained metals not alloyed with lithium, such as Co, Cu, Fe, Mn, Mo, Nb, Ti, V, Cr or W, or the compounds containing these metals, in addition to the aforementioned carbonaceous materials, metals or metal compounds. In the anode active material 9, metal oxides, for example, may be contained in addition to the aforementioned carbonaceous materials, metals or metal compounds. As the metal oxides, oxides containing transition metals are preferred. Examples of these oxides include oxides containing transition metals, for example, crystalline or amorphous compounds, such as iron oxide, ruthenium oxide, molybdenum oxide, tungsten oxide, titanium oxide, tin oxide or silicon oxide. In particular, if these compounds are contained in the anode active material 9, compounds having the charging/discharging potential close to that of metal lithium are desirable.

As the binders used in the anode active material 9 in the anode 5, it is possible to use binders formed of known resin materials and which are routinely used for this sort of the non-aqueous electrolyte battery. Specifically, polyvinylidene fluoride or a styrene butadiene rubber may be used.

The cathode 6 is comprised of a band-shaped cathode substrate 13 on which is formed a layer of a cathode active material 14. A cathode terminal 15 is connected to a preset location of the cathode substrate 13 of the cathode 6 for protruding from one width-wise end of the cathode substrate 13. This cathode terminal 15 is formed e.g. by a strip-shaped metal piece of electrically conductive metal, such as aluminum.

In the cathode 6, the cathode substrate 13 is formed by a cathode resin film 16, formed by for example a polymer film and a cathode metal layer 17 formed of for example an electrically conductive metal.

The polymer film of the cathode resin film 16 in the cathode 6 is e.g. an olefinic resin, a sulfur-containing resin, a nitrogen-containing resin or a fluorine-containing resin, as in the anode resin film 11, described above. Thus, in the cathode 6, the properties of the cathode resin film 16, such as true specific gravity, tensile strength, tensile elasticity or thermal conductivity, are similar to those of the anode resin film 11, thus reducing the weight of the battery 1 and assuring high energy density and improved manufacture yield.

Similarly to the anode metal layer 12, the cathode metal layer 17 in the cathode substrate 13 is formed of relatively lightweight metals exhibiting electron conductivity, such as copper, nickel, titanium, stainless steel, iron or aluminum. In particular, aluminum, having high electrical conductivity, is desirably used as the cathode metal layer 17.

This cathode metal layer 17 is formed to a thickness on the order of several μm, on the major surface of the cathode resin film 16, by a thin film forming technique, such as vapor deposition, sputtering, electroplating or electroless plating. By so doing, the cathode metal layer 17 acts for increasing the electrical conductivity of the cathode substrate 13 to cause the current to flow appropriately in the layer of the cathode active material 14.

When the cathode metal layer 17 is formed on each of the major surfaces of the cathode resin film 16, the metal film on one of the major surfaces of the cathode resin film 16 is electrically connected to the metal film on the opposite major surface thereof, whereby the current may be caused to flow properly through the layers of the cathode active material 14 formed on each major surface of the cathode substrate 13 to increase the electrical conductivity of the cathode 6.

With the cathode substrate 13 of the above structure, in which the cathode resin film 16 is formed by a polymer film and, similarly to the anode resin film 11, may be appreciably reduced in true specific gravity, so that the battery 1 may be lightweight and increased in high energy density.

Moreover, with this cathode substrate 13, one or more through-holes are formed for extending from one to the opposite major surface of the cathode resin film 16 for increasing the electoral contact between the cathode metal layers 17 formed on the two major surfaces of the cathode resin film 16 to increase the electron conductivity.

Additionally, similar to the aforementioned anode substrate 8, the cathode substrate 13 has a thickness not less than 5 μm and not larger than 20 μm for preventing the manufacture yield of the battery 1 or the battery capacity from being lowered.

In the cathode 6, a coating liquid of the cathode mixture, containing the cathode active material, electrically conductive material and the binder is coated on the major surface of the cathode substrate 13, dried in situ and pressed, whereby the layer of the cathode active material 14 is molded under compression on the major surface of the cathode substrate 13. The binder contained in the layer of the cathode active material 14 in this cathode 6 may be formed of any suitable known resin material routinely used in this sort of the layer of the cathode active material 14. Specifically, polyvinylidene fluoride, for example, may be used as the binder. Moreover, the electrically conductive material contained in the layer of the cathode active material 14 may be any suitable known material routinely used in this sort of the non-aqueous electrolyte battery. Specifically, carbon black or graphite, for example, may be used as the electrically conductive material.

In this cathode 6, the cathode active material contained in the layer of the cathode active material 14 may, for example, be oxides, sulfides, nitrides, silicon compounds, lithium-containing compounds or complex metal compounds or. alloys.

Specifically, in case the anode 5 has a sufficient amount of lithium, complex transition metal oxides, represented for example by the general formula $M_xO_y$, where M is one or more of transition metals, are used as the cathode active material. In case the anode 5 does not have a sufficient amount of lithium, lithium complex oxides, represented by the general formula $LiMO_2$, where M is a compound of one or more of Co, Ni, Mn, Fe, Al, V and Ti, for example, are used. The lithium complex oxides may be exemplified by, for example, $LiCoO_2$, $LiNiO_2$, $Li_xNi_yCo_{1-y}O_2$, where x, y differ depending on the charging/discharging states of the battery and usually $0<x<1$ and $0.7<y<1.02$, and spinel type lithium manganese complex oxides, represented by the general formula $LiMn_2O_4$.

In the battery element 2, the separator 7, used for separating and the anode 5 cathode 6 from each other, may be formed of any suitable known material routinely used as an insulating porous film for this sort of the non-aqueous electrode battery. Specifically, polymer films of, for example, polypropylene or polyethylene, may be used. From the relationship between the lithium ion conductivity and the energy density, the thickness of the separator 7 is desirably as thin as possible, with the thickness being not larger than 30 μm.

The outer can 3 is in the form of a bottomed tubular vessel, with its bottom being e.g. circular. The outer can 3 is not limited to the shape having the circular bottom surface and may, for example, be a bottomed tubular vessel having a rectangular or flat circular bottom surface. In case the outer can 3 is electrically connected to the anode 5, the outer can is formed of an electrically conductive metal, such as iron, stainless steel or nickel. In case the outer can 3 is formed of e.g. iron, its surface is plated e.g. with nickel for rust-proofing or improving its electrical conductivity.

The non-aqueous liquid electrolyte 4 is a non-aqueous solution in which an electrolyte salt is dissolved in a non-aqueous solvent. In the non-aqueous liquid electrolyte 4, it is presupposed that a high dielectric constant solvent with a high ability of dissolving an electrolyte salt is used as a main solvent. It is however also possible to use a mixed solvent comprised of the high dielectric constant solvent added by a low viscosity solvent having a high transporting ability for electrolyte ions.

The high dielectric constant solvent may be exemplified by propylene carbonate (PC), ethylene carbonate (EC), butylene carbonate (BC), vinylene carbonate (VC), sulforanes, butyrolactones and valerolactones. The low viscosity solvent may be exemplified by symmetrical or non-symmetrical chained carbonates, such as diethyl carbonate, dimethyl carbonate (DMC), methylethyl carbonate or methylpropyl carbonate. These non-aqueous solvents may be used either singly or in combination of two or more.

Meanwhile, if PC as a main solvent of the non-aqueous solvents and graphites as the anode active material are used in combination, PC tends to be decomposed by the graphites, thus possibly decreasing the battery capacity. For this reason, when graphites are used as the anode active material, EC not liable to be decomposed by graphites or a compound obtained by substituting a halogen element for the hydrogen atom of EC is used as the main component of the non-aqueous solvent.

In this case, optimum battery characteristics may be obtained by substituting a second solvent component for a portion of EC not liable to be decomposed by graphites or a portion of the compound obtained by substituting a halogen element for the hydrogen atom of EC. The second solvent component may be enumerated by PC, BC, VC, 1,2-dimethoxyethane, 1,2-diethoxyethane, γ-buatyrolactone, valerolactone, tetrahydrofuran, 2-methyl tetrahydrofuran, 1,3-dioxolane, 4-methyl-1,3-dioxolane, sulforane, and methyl sulforane. In particular, carbonate based solvents, such as PC, BC or VC, are desirable. The amount of addition of the second solvent component is desirably less than 10 vol %.

In the non-aqueous liquid electrolyte 4, there is no limitation to the electrolyte salt if the electrolyte salt is a lithium salt exhibiting ion conductivity. The non-aqueous liquid electrolyte 4 may be enumerated by, for example, $LiClO_4$, $LiAsF_6$, $LiPF_6$, $LiBF_4$, $LiB(C_6H_5)_4$, $CH_3SO_3Li$, $CF_3SO_3Li$, $LiN(CF_3SO_2)_2$, $LiC(CF_3SO_2)_3$, LiCl and LiBr. These may be used singly or in combination.

The battery 1 of the above-described structure is prepared as follows: First, the anode substrate 8 of the anode 5 is prepared. In preparing the anode substrate 8, the aforementioned electrically conductive metal is formed as a film, by the thin film forming technique, on the major surface of the anode resin film 11, formed by the polymer film described above. This completes the anode substrate 8.

The layer of the anode active material 9 of the anode 5 is then prepared. For preparing the layer of the anode active material 9, a coating liquid of an anode mixture, containing the aforementioned anode active material and a binder, is prepared and uniformly coated on the major surface of the anode substrate 8. The resulting product is dried and subsequently compressed to form the layer of the anode active material 9.

The anode substrate 8 and the layer of the anode active material 9, formed as described above, are cut together to a preset size, and an anode terminal 10 is mounted at a predetermined position of the anode substrate 8. This completes the elongated anode 5.

The cathode substrate 13 in the cathode 6 then is prepared. For preparing the cathode substrate 13, the aforementioned electrically conductive metal is formed as a film, by the thin film forming technique, on the major surface of the cathode resin film 16, formed by the polymer film, to produce a cathode metal layer 17. This completes the cathode substrate 13.

The layer of an cathode active material 14 of the cathode 6 is then prepared. For preparing the layer of the cathode active material 14, a coating liquid of a cathode mixture, containing the aforementioned cathode active material, an electrically conductive material and a binder, is prepared and uniformly coated on the major surface of the cathode substrate 13. The resulting product is dried and subsequently compressed to form the layer of the cathode active material 14.

The cathode substrate 13 and the layer of the cathode active material 14, formed as described above, are cut together to a preset size, and the cathode terminal 15 is mounted at a predetermined position of the cathode substrate 13 by e.g. ultrasonic welding. This completes the elongated cathode 6.

The anode 5 and the cathode 6 are coiled together, with interposition of the elongated separator 7, a large number of turns, to produce the battery element 2. At this time, the battery element 2 is of such a structure that the anode terminal 10 and the cathode terminal 15 are protruded from one end face and from the other end face along the axial direction, respectively.

Then, insulating plates 18a, 18b are mounted on both end faces of the battery element 2, and the battery element 2 is housed in the outer can 3. For collecting the current for the anode 5, the portion of the anode terminal 10 protruded from the battery element 2 is welded to for example the bottom of the outer can 3. The outer can 3 is electrically connected to the anode 5 in this manner to serve as an external anode of the battery 1. Additionally, for collecting the current of the cathode 6, the portion of the cathode terminal 15 protruded from the battery element 2 is welded to a thin sheet for current interruption 19. The cathode terminal 15 is electrically connected to a battery cap 20 in this manner with interposition of the thin sheet for current interruption 19. This battery cap 20, thus electrically connected to the cathode 6, operates as an external cathode of the battery 1. Meanwhile, the thin sheet for current interruption 19 interrupts the current depending on the internal battery pressure.

The non-aqueous liquid electrolyte 4 then is injected into the outer can 3 in which is accommodated the battery element 2. This non-aqueous liquid electrolyte 4 is prepared by dissolving the aforementioned electrolyte salt in the aforementioned non-aqueous solvent. The opening end of the outer can 3 is caulked with an asphalt-coated gasket 21 to secure the battery cap 20 to complete the battery 1.

The battery 1 is also provided with an adhesive tape 22 for preventing the wound state of the battery element 2 from becoming loose, and with a safety valve 23 for degassing the internal space of the battery when the pressure therein exceeds a preset value.

With the battery 1 prepared as described above, the true specific gravity of the anode resin film 11 in the anode 5 and the cathode resin film 16 in the cathode 6, each formed by e.g. a polymer film, may be appreciably reduced as compared to the conventional case in which only a metal foil is used for the electrode substrate, so that the battery may be reduced in weight and increased in battery capacity per unit weight, that is, the battery may be improved in so-called energy density.

Thus, the present battery 1 may be widely used as for example a lightweight high-capacity power supply for portable electronic equipment.

In the above embodiment, the battery 1 uses the non-aqueous liquid electrolyte 4 This is merely illustrative and does not limit the present invention. That is, the present invention may be applied to such a case where an inorganic solid electrolyte, a high polymeric solid electrolyte or a gel electrolyte is used in lieu of the non-aqueous liquid electrolyte 4. The inorganic solid electrolyte may be exemplified by lithium nitride and lithium iodide.

The high polymeric solid electrolyte is formed by the aforementioned electrolyte salt and a high polymeric compound, to which ion conductivity is imparted by the electrolyte salt contained therein. The high polymeric compound, used for the high polymeric solid electrolyte, may be enumerated by, for example, silicon, polyether modified siloxane, polyacryl, polyacrylonitrile, polyphosphasen, polyethylene oxide, polypropylene oxide, and complex polymers, cross-linked polymers or modified polymers thereof, an acrylonitrile butadiene rubber, a polyacrylonitrile-butadiene styrene rubber, an acrylonitrile-polyethylene chloride-propylene-diene-styrene resin, an acrylonitrile-vinyl chloride resin, an acrylonitrile-methacrylate resin, an acrylonitrile-acrylate resin, and an etheric high polymeric material, such as cross-linked product of polyethylene oxide. These may be used either singly or in combination.

Other examples of the high polymeric compound, used in the high polymeric solid electrolyte, include copolymers of acrylonitrile with one or more of vinyl acetate, methyl methacrylate, butyl methacrylate, methyl acrylate, butyl acrylate, itaconic acid, methyl acrylate hydroxide, ethyl acrylate hydroxide, acrylamide, vinyl chloride and vinylidene fluoride, and fluorine-based polymers, such as poly(vinylidene fluoride), poly(vinylidene fluoride-co-hexafluoropropylene, poly(vinylidene fluoride-co-tetrafluoroethylene), and poly(vinylidene fluoride-co-trifluoroethylene). These may be used either singly or in combination.

The gel electrolyte is formed by the aforementioned non-aqueous liquid electrolyte 4 and a polymeric matrix material which is gelated on absorption of the non-aqueous liquid electrolyte 4. As the polymeric matrix material, used for the gel electrolyte, any of the above-mentioned high polymeric compounds that may be geleated on absorbing the non-aqueous liquid electrolyte 4 may be used. Specifically, the polymeric matrix material may be enumerated by fluorine-based polymeric materials, such as poly(vinylidene fluoride) or poly(vinylidene fluoride-co-hexafluoro propylene), etheric polymer material, such as poly(ethylene oxide) or a cross-linked product thereof, and poly(acrylonitrile). These may be used either singly or in combination. In particular, fluorine-based polymeric materials, exhibiting superior redox stability, are preferentially used as the polymeric matrix material.

The foregoing description has been made by taking the cylindrically-shaped battery 1 as an example for illustration. This invention is, however, not limited to this example and may also be applied to a variety of sizes and shapes of batteries, such as batteries employing a metal vessel as an exterior material, e.g. a coin-shaped, square-shaped or a button-shaped battery, a thin type battery or a battery employing a laminate film as an exterior material.

In the explanation of the above examples, the battery 1, as a non-aqueous electrolyte battery, employing a non-aqueous liquid electrolyte, is taken as an example. The present invention is not limited to these examples and may be applied to for example an aqueous electrolyte liquid primary battery, an aqueous electrolyte secondary battery or to a non-aqueous liquid electrolyte primary battery.

EXAMPLES

The following description is made of practically prepared samples of lithium ion secondary batteries as the batteries embodying the present invention.

Samples 1 to 11

The samples 1 to 11 were prepared using polymer films, shown in Table 1, as the anode resin films in the anode.

TABLE 1

| | polymer type | true specific gravity (g/cc) | tensile strength (kgf/mm$^2$) | elongation (%) | tensile elasticity (kgf/mm$^2$) | thermal conductivity (cal/cm$^2 \cdot$ sec $\cdot$ (K $\cdot$ cm$^{-1}$)$^{-1}$) |
|---|---|---|---|---|---|---|
| sample 1 | low density polyethylene | 0.91 | 0.9 | 300 | 25 | $8 \times 10^{-4}$ |
| sample 2 | high density polyethylene | 0.94 | 2.1 | 100 | 120 | $12 \times 10^{-4}$ |
| sample 3 | ultra high molecular polyethylene | 0.94 | 2.5 | 300 | 70 | $14 \times 10^{-4}$ |
| sample 4 | polypropylene | 0.91 | 3.2 | 300 | 120 | $3 \times 10^{-4}$ |
| sample 5 | nylon 6 | 1.10 | 7 | 300 | 200 | $6 \times 10^{-4}$ |
| sample 6 | polyphenylene sulfide | 1.34 | 7 | 3 | 300 | $6 \times 10^{-4}$ |
| sample 7 | polyester-1 | 1.34 | 6 | 300 | 280 | $4 \times 10^{-4}$ |
| sample 8 | polyester-2 | 1.39 | 7 | 70 | 410 | $4 \times 10^{-4}$ |
| sample 9 | cellulose acetate | 1.30 | 11.1 | 10 | 300 | $4 \times 10^{-4}$ |
| sample 10 | polyester-3 (Mylar) | 1.34 | 320 | 7 | 450 | $4 \times 10^{-4}$ |
| sample 11 | polycarbonate | 1.20 | 7 | 100 | 200 | $5 \times 10^{-4}$ |

The manufacturing method for the lithium ion secondary battery, as any of the samples 1 to 11, is now explained in detail.

In preparing the lithium ion secondary battery, an anode substrate in the anode is first prepared. In preparing the anode substrate, anode metal layers were formed by plating on both major surfaces of the 12 sorts of the anode resin films, each 13 μm in thickness, formed of a variety of polymer films, shown in Table 1, to a thickness of 1 μm per surface. In this manner, the anode substrates of samples 1 to 11, each with a thickness of 15 μm, were prepared.

Then, graphite powders, which prove an anode active material, were prepared In preparing the graphite powders, the petroleum pitch coke, as a filler, was mixed with the coal pitch, and the resulting mixture was pressed and molded, under heating to 150° C. The molded product was heat-treated to 300° C. in an inert gas atmosphere. The temperature was then raised to 700° C., after which the molded product was pulverized and classified. The resulting product was heat-treated at 1000° C. in an inert gas atmosphere to yield a graphite precursor. This graphite precursor was heat-treated at 1000° C. in an inert gas atmosphere to produce graphite powders.

An anode, used for each of the samples 1 to 11, was then prepared. In preparing the anode, 90 parts by weight of the graphite powders were prepared and 10 parts by weight of polyvinylidene fluoride (PVdF), as a binder, were homogeneously dispersed in N-methyl-2-pyrrolidone (NMP) to yield an anode mixture as a coating liquid. The coating liquid of the so produced anode mixture was uniformly coated on each major surface of each anode substrate. The resulting product was dried and compacted by a roll press to form a layer of the anode active material. The so produced layer of the anode active material was cut to a predetermined size, along with the anode substrate, and an anode terminal was applied to a predetermined location of the anode substrate. In this manner, the anodes used for the samples 1 to 11 were prepared.

Then, lithium cobalt complex oxide ($LiCoO_2$), as the cathode active material, was prepared. In synthesizing this $LiCoO_2$, lithium carbonate and cobalt carbonate were mixed together to give a ratio of 0.5 mol of lithium carbonate to 1 mol of cobalt carbonate, and the resulting mixture was sintered for five hours in atmospheric air to yield $LiCoO_2$. This $LiCoO_2$ was then pulverized and classified to prepare a $LiCoO_2$ particulate material.

A cathode then was prepared. In preparing the cathode, 91 parts by weight of the $LiCoO_2$ particulate material, prepared as described above, 6 parts by weight of graphite, as an electrically conductive material, and 3 parts by weight of PVdF, as the binder, were homogeneously mixed in NMP to yield a coating liquid of the cathode mixture. The so produced coating liquid of the cathode mixture was uniformly coated on an aluminum foil, 20 μm thick, as a cathode substrate, dried and compacted by a roll press to form a layer of the cathode active material. The so produced layer of the cathode active material was cut to a predetermined size, along with the cathode substrate, and a cathode terminal was mounted to a predetermined location of the cathode substrate to prepare an elongated cathode.

For preparing the battery element, a separator formed by a porous polyethylene film of 23 μm thick was interposed between the anode and the cathode, prepared as described above, to form a layered product, which was then coiled together a large number of turns along the longitudinal direction. By so doing, battery elements each with an outer diameter of 18 mm, used for the samples 1 to 11, were prepared. With each battery element, thus formed, an anode terminal and a cathode terminal were taken out from one end face and from the opposite end face of the produced battery element along the direction of the coiling axis.

The anode terminal, taken out from each battery element produced, was welded to the nickel plated iron outer can, while the cathode terminal was welded to the battery cover, and each battery element was accommodated in the outer can.

The non-aqueous liquid electrolyte, obtained on dissolving $LiPF_6$ in a mixed solvent of ethylene carbonate and dimethyl carbonate at a volumetric ratio of 1:1, so that the molar ratio of $LiPF_6$ to the mixed solvent is 1 mol/lit, was prepared. This non-aqueous liquid electrolyte was then charged into the outer can and the battery cover was press-fitted to the opening end of the outer can with interposition of an asphalt-coated gasket to caulk the opening part of the outer can to secure the battery cover in position.

Ten each of the cylindrically-shaped lithium ion secondary batteries, each 18 mm in diameter and 65 mm in height, were prepared as described above. In the following explanation, the lithium ion secondary battery is referred to simply as battery.

Sample 12

Ten batteries are prepared for a sample 12 in the same way as in the sample 1, except that a copper foil 15 μm in thickness was used as the anode substrate.

For the batteries of the samples 1 to 12, prepared as described above, the battery weight, discharge capacity and the energy density were measured. The results of evaluation of battery weight, initial discharge capacity and the energy density in the respective samples are shown in the following Table 2.

TABLE 2

| | sort of anode substrate | Cu thickness/ polymer thickness (g/cc) | battery weight (g) | initial discharging capacity (mAh) | energy density (Wh/kg) |
| --- | --- | --- | --- | --- | --- |
| sample 1 | Cu/low density polyethylene/Cu | 0.154 | 40.6 | 1960 | 179 |
| sample 2 | Cu/high density polyethylene/Cu | 0.154 | 40.6 | 1960 | 179 |
| sample 3 | Cu/ultra-high molecular weight polyethylene/Cu | 0.154 | 40.6 | 1960 | 179 |
| sample 4 | Cu/polypropylene/Cu | 0.154 | 40.6 | 1960 | 179 |
| sample 5 | Cu/nylon 6/Cu | 0.154 | 40.6 | 1960 | 179 |
| sample 6 | Cu/polyphenylene sulfide/Cu | 0.154 | 40.7 | 1960 | 178 |
| sample 7 | Cu/polyester-1/Cu | 0.154 | 40.7 | 1960 | 178 |
| sample 8 | Cu/polyester-2/Cu | 0.154 | 40.8 | 1960 | 178 |
| sample 9 | Cu/cellulose triacetate/Cu | 0.154 | 40.7 | 1960 | 178 |
| sample 10 | Cu/Mylar/Cu | 0.154 | 40.7 | 1960 | 178 |
| sample 11 | Cu/polycarbonate/Cu | 0.154 | 40.7 | 1960 | 178 |
| sample 12 | Cu foil | 0.154 | 44.0 | 1960 | 164 |

In the samples 1 to 12, the initial discharging capacity was measured as follows: For the batteries of the respective samples, constant current constant voltage charging was carried out for four hours, with the charging current of 1A and the upper limit voltage of 4.2 V. The respective batteries were allowed to stand for two hours and then subjected to constant current discharging, with the discharging current of 1A, up to 2.5V, in order to measure the initial discharging capacity. The energy density represents the initial discharging capacity per unit weight. Meanwhile, the battery weight and the initial discharging capacity entered represent average values obtained from the ten batteries of the respective samples.

It is seen from the results of evaluation shown in Table 2 that, with the samples 1 to 11, employing the polymer film as the anode resin film of the anode substrate, the battery weight and the energy density are lower and higher, respectively, than those of the sample 12 in which the anode substrate is formed solely by a copper foil.

With the sample 12, the anode substrate is formed solely by the copper foil, so that the true specific gravity of the anode substrate is larger than when the anode resin film is used in combination, and hence the battery weight is heavier. Thus, with the sample 12, the battery capacity per unit weight, that is the energy density, is smaller even though the initial discharging capacity is equivalent to that of the other samples.

On the other hand, with the samples 1 to 11, in which the anode substrate is comprised of a composite material of the anode resin film formed by a polymer film, and the anode metal layer formed by a thin copper film, and in which the anode resin film has a specific gravity smaller than that of the anode resin film, the battery weight can be reduced appreciably. Thus, with the samples 1 to 11, the energy density can be larger than that of the sample 12 with a heavier battery weight.

In the batteries of samples 13 to 17, as now explained, the thickness ratio between the thickness of the anode metal layer and that of the anode resin film is varied from that of the sample 3, for confirming the relationship between the battery weight and the degree of support to the current flow, for a case in which the composite layer of the anode resin film and the anode metal layer is used as the anode substrate. Meanwhile, with the sample 3, the thickness ratio between the thickness of the anode metal layer and that of the anode resin film is 0.154.

Sample 13

In the sample 13, the anode substrate was prepared in such a manner that the anode metal layer was formed to a thickness of 0.1 μm on each of the major surfaces of the anode resin film 14.8 μm in thickness, and in such a manner that the thickness ratio between the thickness of the anode metal layer and that of the anode resin film is 0.014. Ten batteries were prepared in the same way as the sample 3, except that this anode substrate was used in this sample 13.

Sample 14

In the sample 14, the anode substrate was prepared in such a manner that the anode metal layer was formed to a thickness of 0.5 μm on each of the major surfaces of the anode resin film 14.5 μm in thickness and in such a manner that the thickness ratio between the thickness of the anode metal layer and that of the anode resin film is 0.071. Ten batteries were prepared in the same way as the sample 3, except that this anode substrate was used in this sample 14.

Sample 15

In the sample 15, the anode substrate was prepared in such a manner that the anode metal layer was formed to a thickness of 6 μm on each of the major surfaces of the anode resin film 9 μm in thickness and in such a manner that the thickness ratio between the thickness of the anode metal layer and that of the anode resin film is 0.667. Ten batteries were prepared in the same way as the sample 3, except that this anode substrate was used in this sample 15.

Sample 16

In the sample 16, the anode substrate was prepared in such a manner that the anode metal layer was formed to a thickness of 10 μm on each of the major surfaces of the anode resin film 5 μm in thickness and in such a manner that the thickness ratio between the thickness of the anode metal layer and that of the anode resin film is 2. Ten batteries were prepared in the same way as the sample 3, except that this anode substrate was used in this sample 16.

Sample 17

In the sample 17, the anode substrate was prepared in such a manner that the anode metal layer was formed to a thickness of 1 μm on each of the major surfaces of the anode resin film 14 μm in thickness and in such a manner that the thickness ratio between the thickness of the anode metal layer and that of the anode resin film is 14. Ten batteries were prepared in the same way as the sample 3, except that this anode substrate was used in this sample 17.

Of the batteries of the samples 13 to 17, prepared as described above, the battery weight, initial discharging capacity, energy density and the discharge capacity upkeep ratio at the time of 3C discharging were measured. The results of evaluation of the battery weight, initial discharging capacity, energy density and the discharge capacity upkeep ratio at the time of 3C discharging in the above samples are shown in Table 3.

TABLE 3

| | sort of anode substrate | Cu thickness/ polymer thickness (g/cc) | battery weight (g) | initial discharging capacity (mAh) | energy density (Wh/kg) | discharge capacity upkeep ratio at the time of 3C discharging (%) |
|---|---|---|---|---|---|---|
| sample 13 | Cu/ultra-high molecular weight polyethylene/Cu | 0.014 | 40.1 | 1960 | 181 | 70 |
| sample 14 | Cu/ultra-high molecular weight polyethylene/Cu | 0.071 | 40.3 | 1960 | 180 | 76 |
| sample 15 | Cu/ultra-high molecular weight polyethylene/Cu | 0.666 | 41.6 | 1960 | 174 | 85 |

TABLE 3-continued

| | sort of anode substrate | Cu thickness/ polymer thickness (g/cc) | battery weight (g) | initial discharging capacity (mAh) | energy density (Wh/kg) | discharge capacity upkeep ratio at the time of 3C discharging (%) |
|---|---|---|---|---|---|---|
| sample 16 | Cu/ultra-high molecular weight polyethylene/Cu | 2 | 42.7 | 1960 | 170 | 87 |
| sample 17 | Cu/ultra-high molecular weight polyethylene/Cu | 14 | 43.7 | 1960 | 166 | 87 |

In the samples 13 to 17, the initial discharge capacity and the energy density were measured in the same way as in the above sample 1. The discharge capacity upkeep ratio at the time of 3C discharging was found as follows: The batteries of the samples 13 to 17 were charged under the charging conditions described above and allowed to stand for two hours. After the batteries were allowed to stand for two hours, the discharge current value was set to approximately 3C and constant-current discharging was carried out up to 2.5 V to measure the discharge capacity at the time of 3C discharging. The discharge capacity upkeep ratio at the time of 3C discharging is the ratio of the discharge capacity at the time of 3C discharging to the initial discharging capacity. Meanwhile, the values of the battery weight, initial discharge capacity and the discharge capacity upkeep ratio at the time of 3C discharging are average values of measured values of the ten batteries of the respective samples.

It may be seen from the results of the evaluation shown in Table 3 that, with the samples 13 to 17 prepared using variable values of the ratio of the thicknesses of the anode metal layer and the anode resin film, the upkeep ratio of the discharge capacity at the time of 3C discharging increases with increasing thickness of the anode metal layer, while the battery weight becomes lighter with increasing thickness of the anode resin film, thus increasing the energy density.

That is, if the thickness of the anode metal layer is thicker, the proportion of the anode metal layer, responsible for increasing electrical conductivity of the anode substrate, is increased to raise the electron conductivity of the anode, thus suppressing the battery capacity from being lowered in case of flow of large current. If conversely the thickness of the anode resin film is increased, the proportion of the anode resin film with a low true specific gravity is increased, thus enabling the battery weight to be decreased and also enabling the energy density to be increased.

The batteries of the samples 18 to 23, manufactured by providing one or more through-holes in the anode substrate in plural batteries similar to the above-described sample 10 is now explained for confirming battery characteristics in case the through-hole(s) are provided in the anode substrate comprised of the anode resin film and the anode metal layer.

Sample 18

In the sample 18, ten batteries were prepared in the same way as the sample 10 except that one through-hole 1 mm in diameter was provided at a preset position of the anode substrate in this sample 18.

Sample 19

In the sample 19, ten batteries were prepared in the same way as the sample 10 except that two through-holes each 1 mm in diameter were provided at preset positions of the anode substrate in this sample 19.

Sample 20

In the sample 20, ten batteries were prepared in the same way as the sample 10 except that ten through-holes each 1 mm in diameter were provided at preset positions of the anode substrate in this sample 20.

Sample 21

In the sample 21, ten batteries were prepared in the same way as the sample 10 except that 80 through-holes each 1 mm in diameter were provided at preset positions of the anode substrate in this sample 21.

Sample 22

In the sample 22, ten batteries were prepared in the same way as the sample 10 except that 1200 through-holes each 1 mm in diameter were provided at preset positions of the anode substrate in this sample 22.

Sample 23

In the sample 23, ten batteries were prepared in the same way as the sample 10 except that 5000 through-holes each 1 mm in diameter were provided at a preset position of the anode substrate in this sample 23.

Of the batteries of the samples 18 to 23, prepared as described above, the battery weight, discharge capacity, energy density and the discharge capacity upkeep ratio at the time of 3C discharging were measured. The results of evaluation of the battery weight, discharge capacity, energy density and the discharge capacity upkeep ratio at the time of 3C discharging of these samples are shown in Table 4.

TABLE 4

| | sort of anode substrate | number of through-holes | battery weight (g) | initial discharge capacity (mAh) | energy density (Wh/kg) | discharge capacity upkeep ratio at the time of 3C discharging (%) |
|---|---|---|---|---|---|---|
| sample 18 | Cu/Mylar/Cu | 1 | 40.6 | 1960 | 179 | 82 |

TABLE 4-continued

| | sort of anode substrate | number of through-holes | battery weight (g) | initial discharge capacity (mAh) | energy density (Wh/kg) | discharge capacity upkeep ratio at the time of 3C discharging (%) |
|---|---|---|---|---|---|---|
| sample 19 | Cu/Mylar/Cu | 2 | 40.6 | 1960 | 179 | 83 |
| sample 20 | Cu/Mylar/Cu | 10 | 40.6 | 1960 | 179 | 84 |
| sample 21 | Cu/Mylar/Cu | 80 | 40.6 | 1960 | 179 | 85 |
| sample 22 | Cu/Mylar/Cu | 1200 | 40.7 | 1960 | 178 | 86 |
| sample 23 | Cu/Mylar/Cu | 5000 | 41.0 | 1960 | 177 | 87 |

In the samples 18 to 23, the initial discharge capacity, energy density and the discharge capacity upkeep ratio at the time of 3C discharging were measured in the same way as the sample 13. It is noted that the battery weight, initial discharge capacity and the discharge capacity upkeep ratio at the time of 3C discharging represent average values of the measured values obtained with the ten batteries of the respective samples.

It may be seen from the results of evaluation shown in Table 4 that, with the samples 18 to 23 prepared with variable numbers of the through-holes provided in the anode substrate, the discharge capacity upkeep ratio at the time of 3C discharging is increased with an increasing number of the through-holes, and that the battery weight is lighter and the energy density is increased with a decreasing number of the through-holes.

That is, if the number of the through-holes in the anode substrate is increased, the electrical linkage due to contact between the anode metal layers formed on both major surfaces of the anode resin film is augmented to increase the electron conductivity of the anode to suppress battery capacity being lowered in case of flow of a large amount of the current. If conversely the number of the through-holes in the anode substrate is diminished, the probability that the through-holes are impregnated with the layer of the anode active material 9 containing the anode active material, whose true specific gravity is larger than that of the anode resin film, is lower, thus decreasing the battery weight to increase the energy density.

The batteries of samples 24 to 28, manufactured as the material types of the anode metal layer were changed from those of the sample 10, for confirming the battery characteristics ascribable to changes in the material types of the anode metal layer in the anode substrate, are now explained.

Sample 24

In the sample 24, ten batteries were manufactured in the same way as the sample 10 except that Ni was formed by a sputtering method as the anode metal layer in the anode substrate in this sample 24.

Sample 25

In the sample 25, ten batteries were manufactured in the same way as the sample 10 except that Fe was formed by a sputtering method as the anode metal layer in the anode substrate in this sample 25.

Sample 26

In the sample 26, ten batteries were manufactured in the same way as the sample 10 except that SUS304 was formed by a sputtering method as the anode metal layer in the anode substrate in this sample 26.

Sample 27

In the sample 27, ten batteries were manufactured in the same way as the sample 10 except that Ti was formed by a sputtering method as the anode metal layer in the anode substrate in this sample 27.

Sample 28

In the sample 28, ten batteries were manufactured in the same way as the sample 10 except that Al was formed by a sputtering method on both major surfaces of the anode resin film of the anode substrate to a thickness of 0.5 μm for each surface and subsequently Cu was formed by a sputtering method for overlying the Al layers to a thickness of 0.5 μm for each surface in this sample 28.

Of the batteries of the samples 24 to 28, prepared as described above, the battery capacity, discharging capacity, energy density and the discharge capacity upkeep ratio at the time of 3C discharging were measured. The battery weight, initial discharging capacity, energy density and the discharge capacity upkeep ratio at the time of 3C discharging in these samples are shown in Table 5.

TABLE 5

| | sort of anode substrate | battery weight (g) | initial discharging capacity (mAh) | energy density (Wh/kg) | discharge capacity upkeep ratio at the time of 3C discharging (%) |
|---|---|---|---|---|---|
| sample 24 | Ni/Mylar/Ni | 40.7 | 1960 | 178 | 82 |
| sample 25 | Fe/Mylar/Fe | 40.7 | 1960 | 178 | 81 |

TABLE 5-continued

| | sort of anode substrate | battery weight (g) | initial discharging capacity (mAh) | energy density (Wh/kg) | discharge capacity upkeep ratio at the time of 3C discharging (%) |
|---|---|---|---|---|---|
| sample 26 | SUS304/Mylar/SUS304 | 40.7 | 1960 | 178 | 77 |
| sample 27 | Ti/Mylar/Ti | 40.5 | 1960 | 179 | 81 |
| sample 28 | Cu/Al/Mylar/Al/Cu | 40.5 | 1960 | 179 | 83 |

In the samples 24 to 28, the initial discharge capacity, energy density and the discharge capacity upkeep ratio at the time of 3C discharging were measured in the same way as in the above-described sample 13. It is noted that the battery weight, initial discharging capacity and the discharge capacity upkeep ratio at the time of 3C discharging, are average values of the measured values obtained with the ten batteries of the respective samples.

It may be seen from the results of evaluation shown in Table 5 that, with the samples 24 to 28, prepared by varying the material types of the anode metal layer of the anode substrate, the electron conductivity of the anode may be raised by employing the electrically conductive metal for the anode metal layer, thereby increasing the discharge capacity upkeep ratio at the time of 3C discharging.

By the content of Ti or Al with low true specific gravity, as samples 27 or 28, in the anode metal layer, the battery weight may be reduced further to increase the energy density.

The batteries of the samples 29 and 30, different from the above sample 10 as to the thickness of the anode substrate in its entirety by changing the thickness of the anode resin film, are hereinafter explained.

Sample 29

In the sample 29, an anode substrate 10 μm thick was manufactured in the same way as in sample 10 except that the anode resin film with a thickness of 8 μm was used in preparing the anode substrate. Ten batteries were manufactured in the same way as in sample 10 except that this anode substrate was used in this sample 29.

Sample 30

In the sample 30, an anode substrate 5 μm thick was manufactured in the same way as in sample 10 except that the anode resin film with a thickness of 3 μm was used in preparing the anode substrate. Ten batteries were manufactured in the same way as in sample 10 except that this anode substrate was used in this sample 30.

The discharge capacity and the ratio of acceptable products were measured of the batteries of the samples 10, 29 and 30. The results of evaluation of the initial discharge capacity and the ratio of acceptable products are shown in Table 6.

TABLE 6

| | sort of anode substrate | thickness of anode substrate | initial discharging capacity (mAh) | ratio of acceptable products (%) |
|---|---|---|---|---|
| Sample 10 | Cu/Mylar/Cu | 15 | 1960 | 100 |
| Sample 29 | Cu/Mylar/Cu | 10 | 2018 | 100 |
| Sample 30 | Cu/Mylar/Cu | 5 | 2075 | 50 |

Of the samples 10, 29 and 30, the initial discharging capacity was measured as in the sample 13 above. Meanwhile, the initial discharge capacity is an average value obtained with ten batteries in the respective samples.

The ratio of acceptable products was found as follows: The samples in which voltage was decreased by not less than 0.2 V when the samples charged/discharged under the above-mentioned charging/discharging conditions were allowed to stand for two hours were retained to be rejects. The ratio of acceptable products is the ratio of the number of acceptable products to the ten batteries of each sample.

It may be seen from the results of evaluation shown in Table 6 that, with the samples 10 and 29 with the thickness of the anode substrate thicker than 10 μm, the ratio of acceptable products is appreciably higher than with the sample 30 with the thickness of the anode substrate equal to 5 μm.

With the sample 30, with the too thin thickness of the anode substrate, the mechanical strength, such as tensile strength, of the anode substrate, is decreased, with the result that the anode substrate is ruptured in manufacturing the battery, thus lowering the battery characteristics.

Conversely, with the samples 10 and 29, the thickness of the anode substrate is proper, thus suppressing deterioration of battery characteristics ascribable to lowered mechanical strength of the anode substrate. With the sample 29, the thickness of the anode substrate is 10 μm which is thinner than the thickness of the anode substrate of the sample 10, so that the layer of the anode active material may be correspondingly increased in thickness to increase the battery capacity.

The batteries of the samples 31 and 36, manufactured using a copper foil as an anode substrate and also using a composite material of the cathode resin film and the cathode metal layer as the cathode substrate, are now explained for confirming the relationship between the battery weight and the degree of support to the current flow in case of using the composite material of the cathode resin film and the cathode metal layer as the cathode substrate.

Sample 31

In the sample 31, the anode was prepared in the same way as in sample 1 except that a copper foil 15 μm thick was used for the anode substrate in this sample 31. The cathode was prepared in the same way as in sample 1 except that an Al layer was formed as a cathode metal layer on each of the major surfaces of the cathode resin film of Mylar, with a thickness of 19.8 μm, by vapor deposition, to a thickness of 0.1 μm per surface, and also except that the ratio between the thickness of the cathode metal layer and that of the cathode resin film was set to 0.010 in this sample 31. Ten batteries were prepared in the same way as in sample 1 except that these anode and cathode were used in this sample 31.

Sample 32

In manufacturing the cathode substrate in the sample 32, the cathode metal layer was formed to a thickness of 0.5 μm on each major surface of the cathode resin film with a thickness of 19 μm, and the ratio between the thickness of the cathode metal layer and that of the cathode resin film was set to 0.053. Ten batteries were prepared in the same way as in sample 31 except that this cathode substrate was used in this sample 32.

Sample 33

In manufacturing the cathode substrate in the sample 33, the cathode metal layer was formed to a thickness of 1 μm on each major surface of the cathode resin film with a thickness of 18 μm and the ratio between the thickness of the cathode metal layer and that of the cathode resin film was set to 0.111. Ten batteries were prepared in the same way as in sample 31 except that this cathode substrate was used in this sample 33.

Sample 34

In manufacturing the cathode substrate in the sample 34, the cathode metal layer was formed to a thickness of 10 μm on each major surface of the cathode resin film with a thickness of 10 μm and the ratio between the thickness of the cathode metal layer and that of the cathode resin film was set to 1. Ten batteries were prepared in the same way as in sample 31 except that this cathode substrate was used in this sample 34.

Sample 35

In manufacturing the cathode substrate in the sample 35, the cathode metal layer was formed to a thickness of 14 μm on each major surface of the cathode resin film with a thickness of 6 μm and the ratio between the thickness of the cathode metal layer and that of the cathode resin film was set to 2.333. Ten batteries were prepared in the same way as in sample 31 except that this cathode substrate was used in this sample 35.

Sample 36

In manufacturing the cathode substrate in the sample 32, the cathode metal layer was formed to a thickness of 18 μm on each major surface of the cathode resin film with a thickness of 2 μm and the ratio between the thickness of the cathode metal layer and that of the cathode resin film was set to 9. Ten batteries were prepared in the same way as in sample 31 except that this cathode substrate was used in this sample 36.

Of the batteries of the samples 31 to 36, prepared as described above, the battery capacity, initial discharging capacity, energy density and the discharge capacity upkeep ratio at the time of 3C discharging were measured. The battery weight, initial discharging capacity, energy density and the discharge capacity upkeep ratio at the time of 3C discharging in these samples are shown in Table 7.

TABLE 7

|  | sort of anode substrate | sort of cathode substrate | Al thickness/ polymer thickness (g/cc) | battery weight (g) | initial discharge capacity (mAh) | energy density (Wh/kg) | discharge capacity upkeep ratio at the time of 3C discharging (%) |
|---|---|---|---|---|---|---|---|
| sample 31 | Cu foil | Al/Mylar/Al | 0.010 | 43.1 | 1960 | 168 | 70 |
| sample 32 | Cu foil | Al/Mylar/Al | 0.053 | 43.2 | 1960 | 168 | 70 |
| sample 33 | Cu foil | Al/Mylar/Al | 0.111 | 43.2 | 1960 | 168 | 70 |
| sample 34 | Cu foil | Al/Mylar/Al | 1 | 43.6 | 1960 | 166 | 76 |
| sample 35 | Cu foil | Al/Mylar/Al | 2.33 | 43.7 | 1960 | 166 | 83 |
| sample 36 | Cu foil | Al/Mylar/Al | 9 | 43.9 | 1960 | 165 | 85 |

In the samples 31 to 36, the initial discharge capacity, energy density and the discharge capacity upkeep ratio at the time of 3C discharging were measured in the same way as in the above-described sample 13. It is noted that the battery weight, initial discharging capacity and the discharge capacity upkeep ratio at the time of 3C discharging are average values of the measured values obtained with the ten batteries of the respective samples.

It may be seen from the results of evaluation shown in Table 7 that, with the samples 31 to 36 in which the thickness ratio between the cathode metal layer and the cathode resin film is varied, the discharge capacity upkeep ratio at the time of 3C discharging becomes larger with increasing thickness of the cathode metal layer, while the battery weight becomes lighter and the energy density becomes higher with increasing thickness of the cathode resin layer.

That is, when the thickness of the cathode metal layer is increased, the proportion of the cathode metal layer playing the role of increasing the electrical conductivity of the cathode substrate is increased to raise the electron conductivity of the cathode, thus suppressing the battery capacity being lowered in case of flow of a large current. If conversely the thickness of the cathode resin film is increased, the proportion of the anode resin film, with a true specific gravity smaller than that of metal, is increased, thus reducing the battery weight and increasing the energy density. That is, by employing the composite material composed of the cathode resin film and the cathode metal layer, as the cathode substrate, it is possible to diminish the battery weight and to raise the energy density. Consequently, the use of the composite material, composed of the resin film and the metal layer, as each of the anode substrate and the cathode substrate, leads to marked weight reduction and appreciably high energy.

What is claimed is:

1. A battery comprising:
   an anode including an anode substrate and a layer of an anode active material and formed on said anode substrate,
   a cathode including a cathode substrate and a layer of a cathode active material and formed on said cathode substrate, and
   an electrolyte containing an electrolyte salt,
   wherein
   at least one of said anode substrate and said cathode substrate includes a resin layer containing a polymer and a metal layer containing electrically conductive metal,
   said polymer has a true specific gravity not less than 0.9 g/cc and not larger than 1.8 g/cc, and
   said resin layer includes one or more through-hole(s) extending from one major surface to an opposite major surface thereof.

2. The battery according to claim 1, wherein said resin layer includes one or more of an olefinic resin, a sulfur-containing resin, a nitrogen-containing resin and a fluorine-containing resin, as said polymer.

3. The battery according to claim 1, wherein said metal layer is formed on each of said major surfaces of the resin layer by a thin film forming technique so that said metal layers are electrically contacted with each other.

4. The battery according to claim 1, wherein said polymer has a thermal conductivity not less than $3\times10^{-4}$ cal/cm$^2$·sec·(K·cm$^{-1}$)$^{-1}$.

5. The battery according to claim 1, wherein said anode contains a carbonaceous material as said anode active material and wherein said cathode contains one or more of transition metal oxides represented by the general formula $M_xO_y$, where M is one or more of transition metals, with $x\geq1$ and $y\geq1$, and lithium complex oxides represented by the general formula $Li_xM_yO_z$, where M is one or more of Co, Ni, Mn, Fe, Al, V and Ti, with $x\geq1$, $y\geq1$ and $z\geq2$.

6. The battery according to claim 1, comprising said anode which is band-shaped, and said cathode which is also band-shaped, said anode and the cathode being coiled longitudinally with a separator in-between.

7. The battery according to claim 1, wherein said metal layer includes one or more of copper, nickel, titanium, stainless steel, iron and aluminum, as said electrically conductive metal.

8. The battery according to claim 1, wherein both said anode and said cathode include a resin layer include a resin layer containing a polymer and a metal layer containing electrically conductive metal.

* * * * *